US010273930B2

(12) United States Patent
Safabakhsh et al.

(10) Patent No.: US 10,273,930 B2
(45) Date of Patent: Apr. 30, 2019

(54) POWER TAKE OFF SYSTEM FOR WAVE ENERGY CONVERTER BUOY

(71) Applicant: Ocean Power Technologies, Inc., Pennington, NJ (US)

(72) Inventors: Mojtaba Safabakhsh, Yardley, PA (US); Chandreshkumar Dubey, East Windsor, NJ (US); John Joseph Bordmann, Philadelphia, PA (US)

(73) Assignee: Ocean Power Technologies, Inc., Pennington, NJ (US)

( * ) Notice: Subject to any disclaimer, the term of this patent is extended or adjusted under 35 U.S.C. 154(b) by 108 days.

(21) Appl. No.: 15/465,585

(22) Filed: Mar. 21, 2017

(65) Prior Publication Data

US 2018/0128236 A1     May 10, 2018

Related U.S. Application Data

(60) Provisional application No. 62/419,903, filed on Nov. 9, 2016.

(51) Int. Cl.
| | | |
|---|---|---|
| *F03B 13/20* | (2006.01) | |
| *F03B 13/16* | (2006.01) | |
| *F03B 13/18* | (2006.01) | |

(52) U.S. Cl.
CPC .......... *F03B 13/16* (2013.01); *F03B 13/1845* (2013.01); *F03B 13/1855* (2013.01); *F03B 13/20* (2013.01); *F05B 2220/7066* (2013.01); *F05B 2240/54* (2013.01); *F05B 2240/60* (2013.01); *F05B 2260/403* (2013.01); *Y02E 10/38* (2013.01)

(58) Field of Classification Search
CPC ...... F03B 13/14; F03B 13/16; F03B 13/1845; F03B 13/1855; F03B 13/187; F03B 13/1875; F03B 13/20
See application file for complete search history.

(56) References Cited

U.S. PATENT DOCUMENTS

| | | |
|---|---|---|
| 2007/0126239 A1 | 6/2007 | Stewart et al. |
| 2007/0261404 A1 | 11/2007 | Stewart et al. |
| 2008/0012538 A1 | 1/2008 | Stewart et al. |
| 2008/0309088 A1 | 12/2008 | Agamloh et al. |
| 2009/0085357 A1 | 4/2009 | Stewart |
| 2009/0146429 A1* | 6/2009 | Protter .................... F03B 13/16 290/53 |
| 2011/0084488 A1 | 4/2011 | Eder et al. |
| 2012/0085089 A1 | 4/2012 | Kuo et al. |
| 2012/0247098 A1 | 10/2012 | Stewart |
| 2012/0248774 A1 | 10/2012 | Stewart |
| 2012/0248775 A1 | 10/2012 | Stewart et al. |
| 2012/0248865 A1 | 10/2012 | Eder et al. |
| 2012/0260755 A1* | 10/2012 | Asher ................. F16C 29/0692 74/89.32 |
| 2014/0007567 A1 | 1/2014 | Stewart |
| 2015/0204304 A1 | 7/2015 | Sidenmark et al. |
| 2015/0275846 A1 | 10/2015 | MacDonald et al. |

* cited by examiner

*Primary Examiner* — Jonathan Matthias
(74) *Attorney, Agent, or Firm* — Jonathan M. Pierce; Porter Hedges LLP

(57) ABSTRACT

A power-take-off system for use in a wave energy converter buoy employs a meshing nut and screw shaft assembly for motion conversion. That is, the motion of the buoy float is coupled to drive the nut along the screw shaft on which it is mounted. The linear movement of the nut along the shaft causes the shaft to rotate and this rotational motion is then coupled to rotate an electrical generator.

22 Claims, 3 Drawing Sheets

POWER TAKE OFF SYSTEM FOR WAVE ENERGY CONVERTER BUOY

This patent application claims the domestic priority of U.S. Provisional Patent Application No. 62/419,903, filed Nov. 9, 2016.

The present invention relates, generally, to wave energy converter (WEC) buoys intended to be deployed in a body of water for an extended period of time (e.g., more than 2 years). More particularly, the invention concerns a power-take-off system (PTO) for use in such a buoy to convert the wave motion of the body of water into usable electrical energy.

BACKGROUND OF THE INVENTION

The disclosure of U.S. Pat. Nos. 8,487,459 and 8,723,355, owned by the assignee of this patent application, are hereby incorporated by reference in their entirety.

A WEC buoy (hereafter, also referred to as a "WEC") includes a payload which requires a substantial amount of electric power for its operation. The payload is comprised of multiple different "loads" including numerous pieces of electric/electronic equipment and electro-mechanical devices such as, for example, radar and/or sonar systems, various wave and/or climate sensors, communication systems and/or relays, various control systems and associated elements, and a braking system. In order to power and operate the payload, each WEC buoy includes a power-take-off system (PTO) for generating (electric) power in response to wave motion of the body of water containing the buoy, and the generated power can then be used to operate the payload.

A WEC buoy and its associated equipment must remain deployed and operational for long periods of time regardless of the climatic conditions, while still providing substantially constant electrical power to the payload. These climatic conditions can vary greatly, from a calm sea (characterized by low amplitude waves) when little, if any, power is generated, to "storm" conditions, characterized by the amplitude of the waves reaching extreme values, when it may become necessary to "lock-up" the buoy, by means of its braking system, to prevent its destruction (ensure its survivability). Under all operating conditions, stored energy must not be depleted, which would render the payload non-operational.

A WEC buoy in which the present invention would be used may include; (a) a float and a spar which move relative to each other in response to the waves; (b) a power-take-off system (PTO) coupled between the float and spar to convert their relative motion into electrical energy; and (c) a brake system to selectively inhibit the relative motion between the float and the spar, for example, under storm conditions. When relative motion is not inhibited, the PTO, must be able to produce electrical energy reliably and efficiently under widely varying conditions.

In the past, PTOs employed in WEC buoys have utilized a rack and pinion mechanism to convert the bobbing movements of the float into rotary motion to drive an electrical generator. That is, the rack was coupled to receive the movement of the float, driving the pinion into rotation, and the pinion's rotary motion was then coupled to drive a shaft of the electric generator. However, the extremely rough and unpredictable movements encountered by the rack, including substantial, unpredictable lateral movement, made its continuous reliable meshing with the pinion problematic. In addition, significant friction exhibited by the mechanism not only resulted in undesirable wear, but made the energy conversion very inefficient (typically, less than 80% efficiency). Energy used in overcoming friction is not available to produce electricity.

Broadly, it is an object of the present invention to provide a PTO for a WEC buoy with improved efficiency in converting wave energy to electricity. It is also an object of the present invention to improve the durability, reliability and endurance of a PTO for a WEC buoy, making it particularly attractive for use in unattended, autonomously operated WEC buoys.

In accordance with one aspect of the present invention, a PTO for use in a WEC buoy employs a meshing nut and screw shaft assembly for motion conversion. That is, the motion of the float is coupled to drive the nut along the screw shaft on which it is mounted. The linear movement of the nut along the shaft causes the shaft to rotate and this rotational motion is then coupled to rotate an electrical generator. Preferably, the nut and screw shaft comprise a ball screw assembly in which a nut with an internal spiral groove mounts a shaft with a corresponding spiral groove, and circulating ball bearings within the grooves form the interface between the nut and shaft. A PTO of this construction can exhibit in excess of 95% efficiency, high reliability, and no appreciable wear during its lifetime of use.

In accordance with another aspect of the present invention, a PTO for use in a WEC buoy employs a meshing nut and screw shaft assembly for motion conversion and a drive tube concentric with the screw shaft has a first end fixed to the nut and a second end constructed to be coupled to receive the motion of the float. The driving force to the nut is thereby provided co-axially to the shaft, as opposed to previous embodiments that the drive force was eccentric to the ball screw. Preferably, the screw shaft, drive tube and generator are mounted as a unit to a two-axis gimbal, so that the nut can be driven co-axially to the screw shaft even when the float imparts lateral motion to the drive tube.

BRIEF DESCRIPTION OF THE DRAWINGS

The foregoing brief description and further objects features and advantages of the present invention will be understood more completely from the following detailed description of presently preferred, but nonetheless illustrative, embodiments in accordance with the present invention, with reference being had to the accompanying drawings in which.

DETAILED DESCRIPTION

Figure 1:
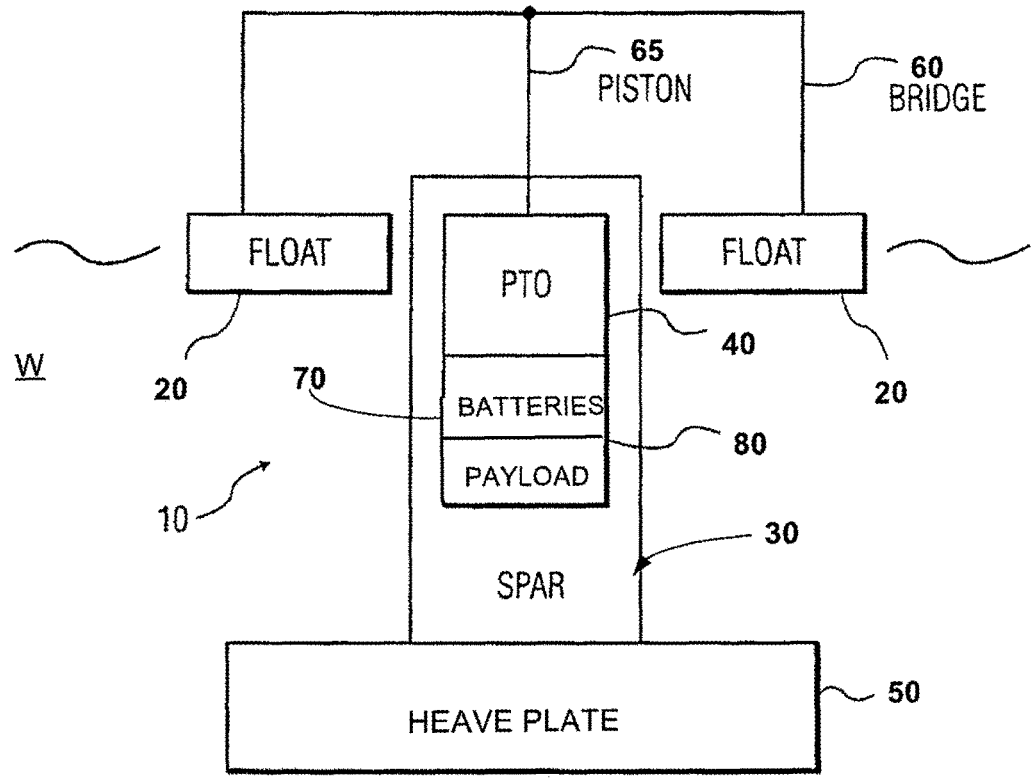
FIG. 1 is a schematic diagram illustrating the typical environment for the present invention.

Turning now to the drawings, FIG. 1 is a schematic diagram illustrating the typical environment for the present invention. A WEC buoy 10 is disposed in a body of water W subjected to wave motion of varying amplitude and frequency. The WEC includes two major wave responsive components, a float 20 and a spar 30. The float 20 is designed to move generally in phase with the waves in which the WEC 10 is positioned, and the spar 30 is designed to be stationary or to move either generally out-of-phase with respect to the waves or in a delayed manner with respect to the float. Thus, in response to the waves in body of water W, there is relative motion between the float 20 and spar 30. Within spar 30, a power-take-off system (PTO) 40 is coupled between float 20 and spar 30 and converts their relative motion into electrical energy.

A heave plate, 50, which may be made of any suitable material (e.g., steel), is shown attached to the bottom, submerged portion of spar 30. Heave plate 50 provides a substantial amount of "added" mass to spar 30, allowing it to remain relatively fixed or to move generally out of phase with the waves. This "added" mass is only partly due to the mass of the material comprising the heave plate 50; much of this "added" mass is due to the entrained water which is moved or pushed up and down by the heave plate.

In FIG. 1, the float 20 is coupled to a bridge structure 60 to which is fixedly attached a thrust (push) rod 65, which is coupled to a power-take-off (PTO) system 40 disposed within the spar 30. As the waves impinge on the WEC 10, the float moves up and down, while the spar is either relatively stationary or moves generally out of phase, or delayed, with respect to the float. The motion of the float which corresponds to, and is generally in phase with, the wave motion is translated into a substantially linear (up/down) motion of the thrust rod 65, which is communicated to the PTO 40, essentially connected between the float and spar.

PTO 40 outputs electric power, which charges batteries 70, which provide power to payload 80. This is a highly simplified drawing intended to illustrate that the PTO 40 can provide the power to charge the batteries 70 and to power the payload 80.

Figure 2:
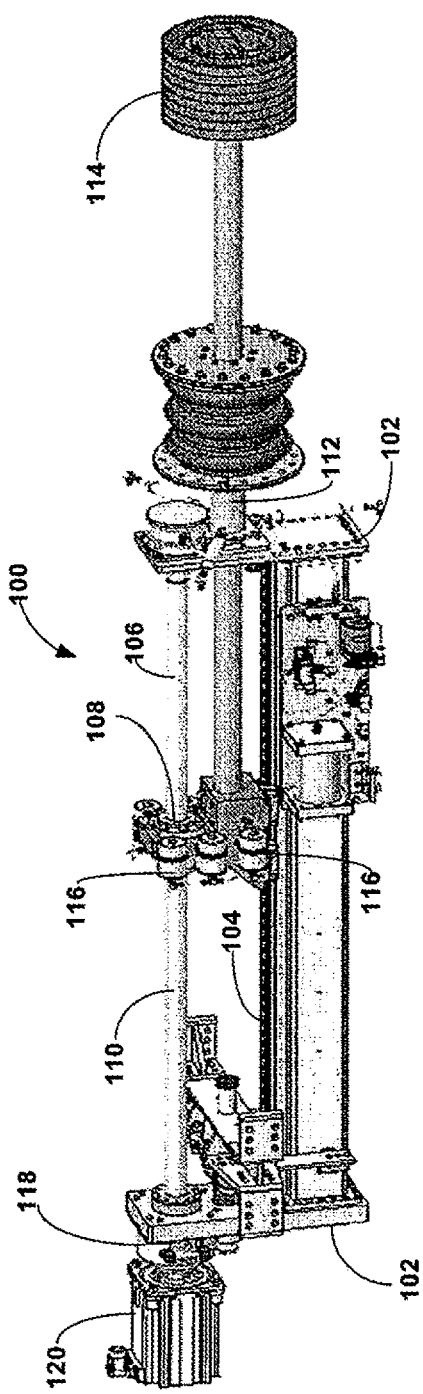
FIG. 2 is a perspective diagram of an embodiment 100 of a PTO system incorporating the invention.

FIG. 2 is a perspective diagram of an embodiment 100 of PTO system 40. The PTO is illustrated horizontally for convenience, but it will be appreciated that, in use, it would be upright. The PTO has a single chassis 102 on which all of the components are mounted. A guide rail 104 is provided on the chassis, on which a carriage 106 can ride. Secured at the top of carriage 106, is a ball nut 108 which is mounted on a screw shaft 110. The ends of shaft 110 are mounted in chassis 102 via appropriate bearings. An input shaft 112 is connected at one end to carriage 106 and, at its opposite end, is provided with an assembly 114, constructed to be connected to the bridge 60 (FIG. 1). Lubrication units 116 provide lubrication to guide rail 104 and nut 108. A coupling 118 connects the end of shaft 110 to the shaft of an electrical generator 120.

In operation, the back and forth movement of the input shaft 112 causes carriage 106 to slide along rail 104. Carriage 106 carries nut 108 with it, and the movement of nut 108 along shaft 110 produces rotation of shaft 110. This rotation is transmitted to generator 120 via coupling 118, causing the generator to produce electrical power.

Nut 108 and shaft 110 together comprise a ball screw assembly. The ball screw assembly is a useful mechanism for conversion between rotary and linear motion. The ball screw based PTO integrates all of the primary functions needed on a WEC PTO including: linear to rotary motion conversion (ball screw), generator, brake system, linear seal, and self-aligning mounting.

Figure 3:
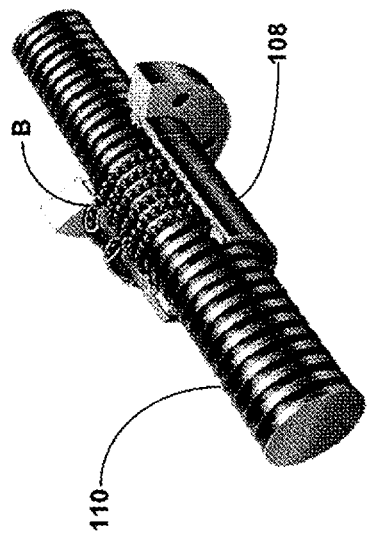
FIG. 3 is a perspective drawing of a ball screw assembly.

FIG. 3 is a perspective drawing of a typical ball screw assembly. Nut 108 has an internal spiral groove and shaft 110 has a corresponding, opposed spiral groove on its surface. Ball bearings B are re-circulated within nut 108 and travel along the spiral grooves in the nut and screw shaft, forming a nearly frictionless interface between them. Using this construction in PTO 100 provides reliable mechanical operation with no appreciable wear under all operating conditions. Being nearly frictionless, it can result in a conversion efficiency in excess of 95%.

Figure 4:
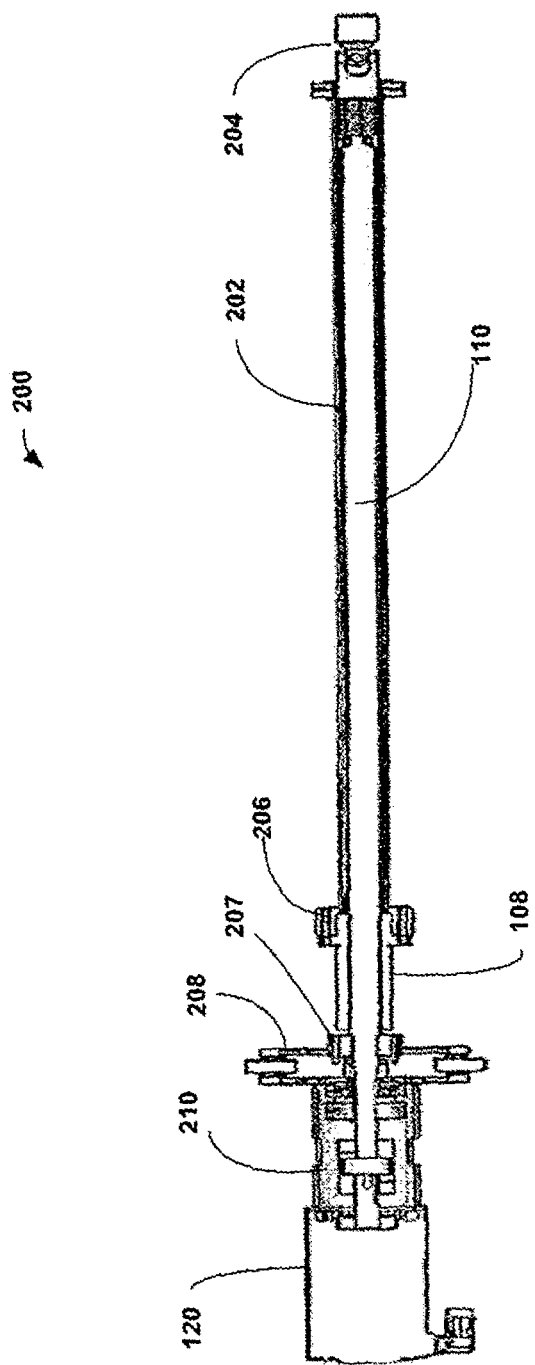
FIG. 4 is a schematic, cross-sectional diagram illustrating an alternate embodiment 200 of a PTO system incorporating the invention.

FIG. 4 is a schematic, cross-sectional diagram illustrating an alternate embodiment 200 of PTO system 40. This embodiment also utilizes the ball screw assembly comprising nut 108 and shaft 110. In this embodiment, a close-fitting drive tube 202 is mounted concentrically over shaft 110. At its upper end (although drawn horizontally, PTO 200 is actually upright in use), tube 202 is provided with a fitting 204 suitable for connection to the bridge 60 (FIG. 1), and at its lower end, tube 202 is securely connected, via a flange 206, to nut 108. Tube 202 is sealed at either end and internally coated to minimize friction between it and shaft 110. The lower end of the shaft 110 is mounted, via a bearing 207, in a two-axis gimbal 208 supported in the PTO frame (not shown). The gimbal is constructed to provide pivoting of shaft 110 about two orthogonal axes perpendicular to it, allowing self-alignment of tube 202 in the event that its drive is not precisely axial. The gimbal also provides torque reaction for nut 108. A coupling 210 mounted to gimbal 208 provides connection between shaft 110 and the shaft of generator 120.

In operation, the drive tube 202 forces nut 108 along shaft 110, causing shaft 110 to rotate. That rotation is then transmitted via the coupling 210 to the shaft of generator 120, producing electrical energy.

Gimbal 208 assures that the drive force for nut 108 is essentially axial to the shaft 110 and will not produce a pivoting torque on nut 108. In contrast, PTO 100 provided the force to shaft 110 from one side, applying a pivoting torque to the nut. Also, in PTO 100, the relatively massive carriage 106 and input shaft 112 required in a complex and massive frame. Thus, PTO 200 provides a simplified construction. It also presents a much lower mass to be driven by bridge 60 through drive tube 202. Therefore, a higher proportion of the driving energy can be converted to electrical energy.

Significant features of the embodiment shown in FIG. 4 include: (1) The use of a rod-less back-driving PTO in a WEC; (2) The use of a thrust tube in the PTO that is coated and sealed allowing it to also be the transmission of linear mechanical power from the extreme marine environment to the internal machine environment; and (3) the use of a two axis gimbal to provide torque reaction of the ball nut as well as a pivot for self alignment of the PTO to achieve substantially axial drive of the nut along the shaft.

Features of the ball screw PTO include: (1) Use of a self-aligning ball screw PTO for WEC applications; and (2) Full integration of a brake system and linear seal with the PTO providing modularity.

Although one type of drive has been shown, it should be understood that, in systems embodying the invention, either the nut or the screw shaft can be driven linearly causing the other to rotate, the rotational motion being coupled to the electrical generator.

Although preferred embodiments of the invention have been disclosed for illustrative purposes, those skilled in the art will appreciate that many additions, modifications and substitutions are possible, including those specifically discussed above, without departing from the scope and spirit of the invention as defined by the accompanying claims.

What is claimed:
1. A power-take-off system (PTO) for a wave energy conversion buoy (WEC) of the type having a float to extract the wave motion in a body of water, comprising:
   a screw shaft having a helical groove therein;

a nut on said shaft having an internal helical groove conformed to the shaft groove and cooperating mechanically therewith;

a driver connected to one of said screw shaft and said nut, said driver being constructed to be coupled to receive the wave motion extracted by the float; and a coupling connected to the other of said screw shaft and said nut, said coupling being constructed to couple rotational motion of said other to an electrical generator;

whereby force received by said driver moves said one and causes said other to rotate, the rotational motion being transferred to said coupling and therefrom to the connected generator.

2. The PTO of claim 1 wherein said driver is connected to said nut and force received by said driver moves said nut along said screw shaft, causing the shaft to rotate.

3. The PTO of claim 1 further comprising a plurality of ball bearings within the grooves of the nut and screw shaft and trapped therebetween, the ball bearings forming a rolling interface therebetween.

4. The PTO of claim 2, further comprising:
a chassis in which said screw shaft is mounted for rotational movement;
said driver comprising:
a carriage mounted in said chassis for linear movement substantially parallel to said screw shaft and secured to said nut; and
an input shaft having a first end secured to said carriage and a second end constructed to be coupled to receive the wave motion extracted by the float;
said coupling being mounted on said chassis; and
a generator mounted to said chassis through said coupling.

5. The PTO of claim 4 further comprising a plurality of ball bearings within the grooves of the nut and screw shaft and trapped therebetween, the ball bearings forming a rolling interface therebetween.

6. The PTO of claim 1, said driver comprising a drive tube concentric with said screw shaft, the drive tube having a first end fixed to said nut and a second end constructed to be coupled to receive the wave motion extracted by the float.

7. The PTO of claim 6 further comprising a plurality of ball bearings within the grooves of the nut and screw shaft and trapped therebetween, the ball bearings forming a rolling interface therebetween.

8. The PTO of claim 6 wherein said drive tube is sealed at either end and internally conditioned to provide low friction to said screw shaft.

9. The PTO of claim 6 further comprising means for mounting said PTO for rotational movement about two orthogonal axes substantially perpendicular to an axis of said screw shaft, whereby said drive tube is self-aligning to receive said wave motion substantially axially.

10. The PTO of claim 9 wherein said means for mounting is a two-axis gimbal, and bearing means mounts said screw shaft in said gimbal for rotation.

11. The PTO of claim 9 wherein said coupling is mounted to said gimbal and further comprising a generator mounted to said gimbal through said coupling.

12. The PTO of claim 1 wherein a wave energy conversion buoy including a float and a spar, the PTO being in the spar.

13. A method for improving the efficiency of a power-take-off system (PTO) for a wave energy conversion buoy (WEC) of the type having a spar and a float to extract the wave motion in a body of water, comprising the steps of:
providing a screw shaft having a helical groove therein;
providing a nut on said shaft having an internal helical groove conformed to the shaft groove and cooperating mechanically therewith;
providing a driver connected to one of screw shaft and said nut, the driver being coupled to receive the wave motion extracted by the float;
providing a coupling connected to the other of said screw shaft and said nut, the coupling providing rotational motion of said other to an electrical generator;
whereby, force received by said driver linearly moves said one and causes said other to rotate, the rotational motion being transferred to said coupling and therefrom to the connected generator.

14. The method of claim 13 wherein said driver is connected to said nut and force received by said driver moves said nut along said screw shaft, causing the screw shaft to rotate.

15. The method of claim 13 further comprising providing a plurality of ball bearings within the grooves of the nut and screw shaft and trapped therebetween, the ball bearings forming a rolling interface therebetween.

16. The method of claim 13, further comprising the steps of:
providing a chassis in which said screw shaft is mounted for rotational movement;
said driver comprising:
a carriage mounted in said chassis for linear movement substantially parallel to said screw shaft and secured to said nut; and
an input shaft having a first end secured to said carriage and a second end constructed to be coupled to receive the wave motion extracted by the float;
mounting said coupling on said chassis; and
mounting a generator to said chassis through said coupling.

17. The method of claim 16 further comprising providing a plurality of ball bearings within the grooves of the nut and screw shaft and trapped therebetween, the ball bearings forming a rolling interface therebetween.

18. The method of claim 13, wherein said driver comprises a drive tube concentric with said screw shaft, the drive tube having a first end fixed to said nut and a second end receiving the wave motion extracted by the float.

19. The method of claim 18 further comprising providing a plurality of ball bearings within the grooves of the nut and screw shaft and trapped therebetween, the ball bearings forming a rolling interface therebetween.

20. The method of claim 18 performed with a drive tube that is sealed at either end and is internally conditioned to provide low friction to said screw shaft.

21. The method of claim 18 further comprising providing means for mounting said PTO for rotational movement about two orthogonal axes substantially perpendicular to an axis of said screw shaft, whereby said drive tube is self-aligning to receive said wave motion substantially axially.

22. The method of claim 21 wherein said means for mounting is a two-axis gimbal, and bearing means is provided mounting said screw shaft in said gimbal for rotation.

* * * * *